United States Patent [19]
Ashworth et al.

[11] Patent Number: 5,967,061
[45] Date of Patent: Oct. 19, 1999

[54] METHOD AND SYSTEM FOR REDUCING NITROGEN OXIDE AND SULFUR OXIDE EMISSIONS FROM CARBONACEOUS FUEL COMBUSTION FLUE GASES

[75] Inventors: Robert A. Ashworth, Wooster; Donald K. Morrison, Clinton, both of Ohio; Roy Payne, Mission Viejo, Calif.

[73] Assignee: Energy and Environmental Research Corporation, Irvine, Calif.

[21] Appl. No.: 08/783,170

[22] Filed: Jan. 14, 1997

[51] Int. Cl.[6] ........................................ F23J 15/00
[52] U.S. Cl. ........................................ 110/203
[58] Field of Search ............................... 110/203

[56] References Cited

U.S. PATENT DOCUMENTS

| | | | |
|---|---|---|---|
| 3,589,314 | 6/1971 | Tratz et al. | 110/28 |
| 3,900,554 | 8/1975 | Lyon | 423/235 |
| 4,208,386 | 6/1980 | Arand et al. | 423/235 |
| 4,325,924 | 4/1982 | Arand et al. | 423/235 |
| 4,335,084 | 6/1982 | Brogan | 423/235 |
| 4,403,941 | 9/1983 | Okiura et al. | 431/10 |
| 4,444,126 | 4/1984 | Förster | 110/238 |
| 4,465,495 | 8/1984 | Scheffee | 44/51 |
| 4,851,201 | 7/1989 | Heap et al. | 423/235 |
| 4,861,567 | 8/1989 | Heap et al. | 423/235 |
| 5,078,064 | 1/1992 | Breen et al. | 110/212 |
| 5,116,584 | 5/1992 | Chen et al. | 423/235 |
| 5,139,755 | 8/1992 | Seeker et al. | 423/235 |
| 5,224,334 | 7/1993 | Bell | 60/274 |
| 5,270,025 | 12/1993 | Ho et al. | 423/235 |
| 5,380,342 | 1/1995 | Leonard, III et al. | 44/280 |
| 5,443,805 | 8/1995 | Beér et al. | 423/235 |
| 5,513,583 | 5/1996 | Battista | 110/261 |
| 5,746,144 | 5/1998 | Breen et al. | 110/345 |

OTHER PUBLICATIONS

Morrison D.K. et al., Coal–Water Slurry Reburning for Nox Emissions Control, Proceedings of the 20th International Technical Conference on Coal Utilization & Fuel Systems, Clearwater, FL USA, pp. 47–58, Mar. 1995.

Ashworth R.A. et al., Coal Fines Utilization Technologies, Proceedings of the 20th International Technical Conference on Coal Utilization & Fuel Systems, Clearwater, FL, pp. 559–570, Mar. 1995.

(List continued on next page.)

*Primary Examiner*—Henry Bennett
*Assistant Examiner*—Malik N. Drake
*Attorney, Agent, or Firm*—Workman, Nydegger & Seeley; Gregory M. Taylor

[57] ABSTRACT

A method and system is provided for the reduction of nitrogen and sulfur oxides emissions from carbonaceous fuel combustion flue gases. The method includes the injection of coal water slurry as a reburn fuel into furnace flue gases to partially oxidize the coal water slurry thereby producing reducing gas species in a reburn zone that convert flue gas nitrogen oxides to diatomic nitrogen. Optionally, sulfur oxides may also be removed from the flue gas by adding alkali compounds to the coal water slurry before injecting the slurry into the furnace, or by injecting the alkali compounds separately into the reducing reburn zone in the furnace created by the partial oxidation of the coal water slurry reburn fuel. The alkali compounds react with the sulfur species to produce alkali sulfite and sulfate particulate solids, which can be removed in a downstream particulate removal device such as an electrostatic precipitator or bag house.

55 Claims, 3 Drawing Sheets

OTHER PUBLICATIONS

Hsieh, B.C et al., *An Analysis of Chemistry and Mechanisms for High Temperature Desulfurization of Low BTU Gas When Using Lime or Limestone*, Gilbert Associates, Inc., 1974. (No month.).

Gullet, Brian K. et al., *Furnace Slurry Injection for Simultaneous $SO_2/NO_x$ Removal*, The 1991 $SO_2$ Control Symposium, vol. 2: Sessions 5A–6B, pp. 87–103, Dec. 3–6, 1991.

Eckhart, C.F. and DeVault, R.F., *Cyclone Reburn Using Coal–Water Fuel: Pilot Scale Development and Testing*, Report DOE/PC/90157–1, Sponsored by U.S. Dept. of Energy and Pittsburgh Energy Technology Center, The Babcock & Wilcox Company, Oct. 1991.

Elliott, Martin A. (Ed.), *Chemistry of Coal Utilization*, Prepared under the Guidance of the Committee on Chemistry of Coal Utilization, Second Supplementary Volume, pp. 1272–1277, John Wiley & Sons, 1981 (no month).

Lyon, Richard K. and Hardy, James E., *Discovery and Development of the Thermal $DeNO_x$ Process*, Exxon Res. and Eng. Co., Reprinted from I&EC Fundamentals, vol. 25, No. 1, pp. 19–24, 1986. (No month.).

Miller, James A. and Bowman, Craig T., *Mechanism and Modeling of Nitrogen Chemistry in Combustion*, Prog. Energy Combust. Sci., vol. 15, pp. 287–338, 1989. (No month.).

Chen, S.L. et al., *Advanced Non–Catalytic Post Combustion $NO_x$ Control*, Environmental Progress, vol. 10, No. 3, pp. 182–185, Aug. 1991.

METHOD AND SYSTEM FOR REDUCING NITROGEN OXIDE AND SULFUR OXIDE EMISSIONS FROM CARBONACEOUS FUEL COMBUSTION FLUE GASES

BACKGROUND OF THE INVENTION

1. The Field of the Invention

The present invention relates to methods for removing or reducing air pollutants in combustion flue gases. More particularly, the present invention relates to a method and system for the reduction of nitrogen and sulfur oxides emissions from carbonaceous fuel combustion flue gases in industrial and utility furnaces.

2. The Relevant Technology

The use of coal water slurry as a fuel is well known, but historically in the United States, with minor exceptions, the use of coal water slurry has been confined primarily to demonstration projects. The disadvantages of using coal water slurry in the past have been related to the energy required to evaporate the water in the slurry, and the relatively high price of preparing and transporting a high coal density (65% plus coal) coal water slurry fuel. However, with new coal processing techniques, waste coal fines from coal perparation plants, which have been impounded in ponds, may now be recovered very economically in a coal water slurry form. The recovered coal water slurry fuel in many cases will be less expensive than the processed coal sold from these preparation plants. It is estimated that two to four billion tons of such coal fines reserves are impounded in ponds throughout the United States. It would be very beneficial to use these low cost waste coal fines as a fuel and to do so in an environmentally acceptable manner.

In U.S. Pat. No. 3,589,314 to Tratz et al., a method and device for pressure spraying and burning a 60/40 weight ratio coal dust/water mixture is described. Complete combustion of the coal dust/water mixture in a furnace is accomplished by heating the mixture under pressure prior to spraying the mixture through a nozzle with radial or axial bores into a combustion chamber. Additionally, U.S. Pat. No. 4,444,126 to Forster describes an apparatus for combustion of a suspension of coal particles in water, in which combustion air preheated to 550° C. (1022° F.) is forced into a coal water slurry preheated to 100° C. (212° F.) in a portion of the burner, upstream of the burner flame. In U.S. Pat. No. 4,465,495 to Scheffee, a process is disclosed for making a high heating value coal water slurry fuel that can be injected directly into a furnace as a combustible fuel for the express purpose of replacing fuel oil in oil-fired boilers.

Furthermore, U.S. Pat. No. 5,380,342 to Leonard et al. describes a process of co-firing coal water slurry specifically in a gas fired boiler through gas burners. The furnace is preheated using natural gas and is then fired with approximately 60% of the heat input supplied by pulverized coal and 40% of the heat input supplied by natural gas. The gas is gradually shut off completely while coal water slurry is added such that the heat input ratio of pulverized coal to coal water slurry is 80/20. The process of this patent is specifically directed to a modified gas fired boiler wherein the burners are designed to fire three fuels: natural gas, coal water slurry, and pulverized coal.

While the above processes accomplish their intended purpose to facilitate the combustion of coal water slurry in fossil fuel boilers, they are not specifically designed to reduce the emissions of oxides of nitrogen and sulfur, which are acid rain precursors, to the atmosphere.

In pilot scale testing, an expensive to produce, high density (72% coal/28% water) coal water slurry fuel has been tested as a reburn fuel on a cyclone-fired test unit under a U. S. Department of Energy Research and Development program (DOE Report DOE/PC/190157-1). Under this test work, coal water slurry was fired through a reburning burner with some 40% stoichiometric air into a reburn zone. A $NO_x$ reduction of approximately 60% was achieved with at least 30 to 35% of the boiler heat input coming from the coal water slurry reburn fuel. With this approach, however, air addition to the burner creates an excessive reburn fuel requirement in order to reduce the air stoichiometry in the reburn zone to the desired level for good $NO_x$ reduction. Further, the more fuel that is fired in the reburn zone, the more the reburn fuel alters the furnace heat absorption profile. Still further, the reburn technique used was based on the use of a high cost, high density coal water slurry fuel. While this technique will reduce the emissions of oxides of nitrogen to the atmosphere, it does not reduce sulfur dioxide emissions and is not very cost effective or operationally beneficial.

Several U.S. Department of Energy, Clean Coal Technology (CCT) commercial demonstrations have been completed recently based on the partial oxidation of natural gas and fine pulverized coal for utility boiler in-furnace reduction of nitrogen oxides. These technologies are called "reburn" technologies. With reburn technology, coal supplied to burners for cyclone-fired, tangentially-fired and wall-fired boilers is combusted under normal excess air operating conditions at about 70% to 90% of the total heat input. Reburn fuel is then injected into the furnace in a reburn zone above the conventional burners either through burners or injectors. In the reburn zone, the overall stoichiometry of combustion is reduced from an excess air condition to an air deficient condition through addition of the reburn fuel. Above the furnace reburn zone, additional air called "overfire air" is added to once again create an excess air condition in the boiler, hence the name "reburn" was applied to this technology.

Various techniques for injecting alkali compounds into coal-fired boiler furnaces both through and above pulverized coal-fired burners, for the capture of sulfur oxides as alkali sulfites and sulfates is also known.

While the above mentioned reburn and alkali injection processes have been demonstrated for reducing the emissions of oxides of nitrogen and sulfur from fossil-fuel fired boilers, an improved process is needed that will allow for the use of a low cost coal water slurry fuel that when fired in a boiler will reduce atmospheric emissions of acid rain precursors, in the form of oxides of nitrogen and sulfur, and offer to electric and industrial utilities a very low cost option with minimal boiler thermal impacts, to meet the more stringent environmental regulations in the furture.

SUMMARY AND OBJECTS OF THE INVENTION

The present invention is a method and system for the reduction of nitrogen oxide emissions from carbonaceous fuel combustion flue gases, in which coal water slurry (CWS) is injected into a combustion flue gas to partially oxidize the CWS fuel to produce reducing gas species that convert flue gas nitrogen oxides to diatomic nitrogen. The coal water slurry is injected as a reburn fuel into a combustion furnace above or downstream of conventional fuel burners at a rate to effect a reducing or gasification reburn zone in the furnace. The flue gases from the fuel burners containing nitrogen oxides must pass through the reducing reburn zone, where the reducing gas species convert the incoming $NO_x$ to diatomic nitrogen. Above or further downstream from the reducing reburn zone, overfire air is added to create an overfire air zone having an excess air condition to completely combust the flue gas leaving the reburn zone.

In more detail, the present invention includes injecting a coal water slurry as a reburn fuel into a combustion furnace at a point above conventional primary carbonaceous fuel burners operating under excess air combustion conditions where the temperature of the flue gases from the carbonaceous fuel burners is in a range from about 2400° F. to 3200°F. The coal water slurry can be injected into the furnace without firing the slurry in a reburn burner. Preferably, a dual-fluid atomizer nozzle is utilized to atomize and spray the coal water slurry into the furnace. The conventional fuel burners are fired at a rate to provide for about 70 to 90 percent of the heat input into the furnace. The coal water slurry, preferably comprising about 40 to 65 weight percent coal, is injected as a spray at a rate of about 10 to 30 percent of the heat input into the furnace and to provide a stoichiometric air condition of about 70 to 90 percent of that needed for the complete combustion of all the fuel in the furnace. A reducing reburn zone is created in the furnace where the coal water slurry is injected, forming reducing gas species that will react with oxides of nitrogen to form diatomic nitrogen. This reduces the concentration of nitrogen oxides in the flue gases in an amount from about 30 to 80 percent. Overfire air is introduced into the furnace to bring the total stoichiometric air addition up to a level of about 110 to 130 percent of that required to combust all of the fuel in the furnace. The overfire air is introduced into the furnace at a point such that the flue gases have a residence time within the reburn zone of about 0.2 to 1.5 seconds prior to being contacted with the overfire air. Such overfire air addition provides for the complete combustion of reburn fuel gases created by the injection of the coal water slurry into the furnace.

One of the benefits of using coal water slurry as a reburn fuel is that at the reburn zone temperature level, in the range of about 2400 to 3200° F/., the carbon-water reaction kinetics are as fast as the carbon-oxygen reaction kinetics, thus providing for a faster rate of decomposition and gasification of the coal. With faster gasification rates, the residence time of the flue gases in the reducing reburn zone is increased, thus effecting an increased reduction of nitrogen oxides and also improving fuel carbon conversion.

A low cost sulfur dioxide removal technique may be optionally added to the method of the invention through the addition of alkali compounds to the coal water slurry before injecting the slurry into the furnace or by injecting the alkali compounds separately into the reducing reburn zone in the furnace created by the partial oxidation of the coal water slurry reburn fuel. The introduced alkali compounds will react with the sulfur species in the flue gas to finally produce alkali sulfites and sulfates, which may be removed in a downstream particulate removal device such as an electrostatic precipitator or bag house.

In more detail, the sulfur dioxide removal technique is accomplished by adding an alkali sorbent such as compounds of calcium, magnesium, sodium, and potassium. Compounds of these alkali metal elements that are effective reactants with sulfur dioxide include hydroxides, oxides, acetates, carbonates, and bicarbonates. The alkali sorbent used may be a single compound, or any combination of the above alkali compounds in a variety of mixtures. The alkali compounds may be added to the coal water slurry mixture and be injected into the furnace as a slurry, or may be injected separately into the reducing reburn zone created by the injection of the coal water slurry reburn fuel. If injected separately, the alkali compound(s) may be injected pneumatically in a dry form, or may be injected in a wet form using an alkali solution/slurry mixture. One way to improve the alkali utilization, e.g. calcium utilization, is to inject very small particles into the furnace. By injecting the alkali compound particles in a slurry form, the rapid evaporation of water from the void interstices in the particle, as the particle enters the hot furnace, will fracture the particle and increase the overall surface area for subsequent reaction with the sulfur oxides.

Another benefit of adding the alkali sorbent with the reburn fuel is that problems of reduced heat transfer for the generation of steam as found in conventional in-furnace alkali injection systems are avoided. In such conventional systems the alkali is not injected with the fuel and the resultant alkali particle color is white. Thus, with even a slight covering of these white particles on boiler tube surfaces, the reflectivity of the boiler tubes increases and reduces heat transfer for generation of steam in the boiler tubes.

The present invention is an economical method and system for the reduction of nitrogen oxide emissions from carbonaceous fuel combustion flue gases since a low cost coal water slurry reburn fuel may be utilized. The coal water slurry reburn technique of the invention may be easily retrofitted to existing combustion furnaces such as industrial and electric utility boilers, and may also be applied to new boiler installations.

Accordingly, a principle object of the present invention is to provide an economical method and system for the reduction of nitrogen oxide emissions from carbonaceous fuel combustion flue gases through the use of a low-cost coal water slurry reburn fuel.

Another object of the invention is to provide a low-cost sulfur dioxide removal technique that may be used in conjunction with the coal water slurry reburn fuel method for reducing nitrogen oxides.

A further object of the invention is to provide a coal water slurry reburn technique that may be easily retrofitted to existing industrial or electrical utility furnaces, or applied to new furnace installations.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE INVENTION

Figure 1:
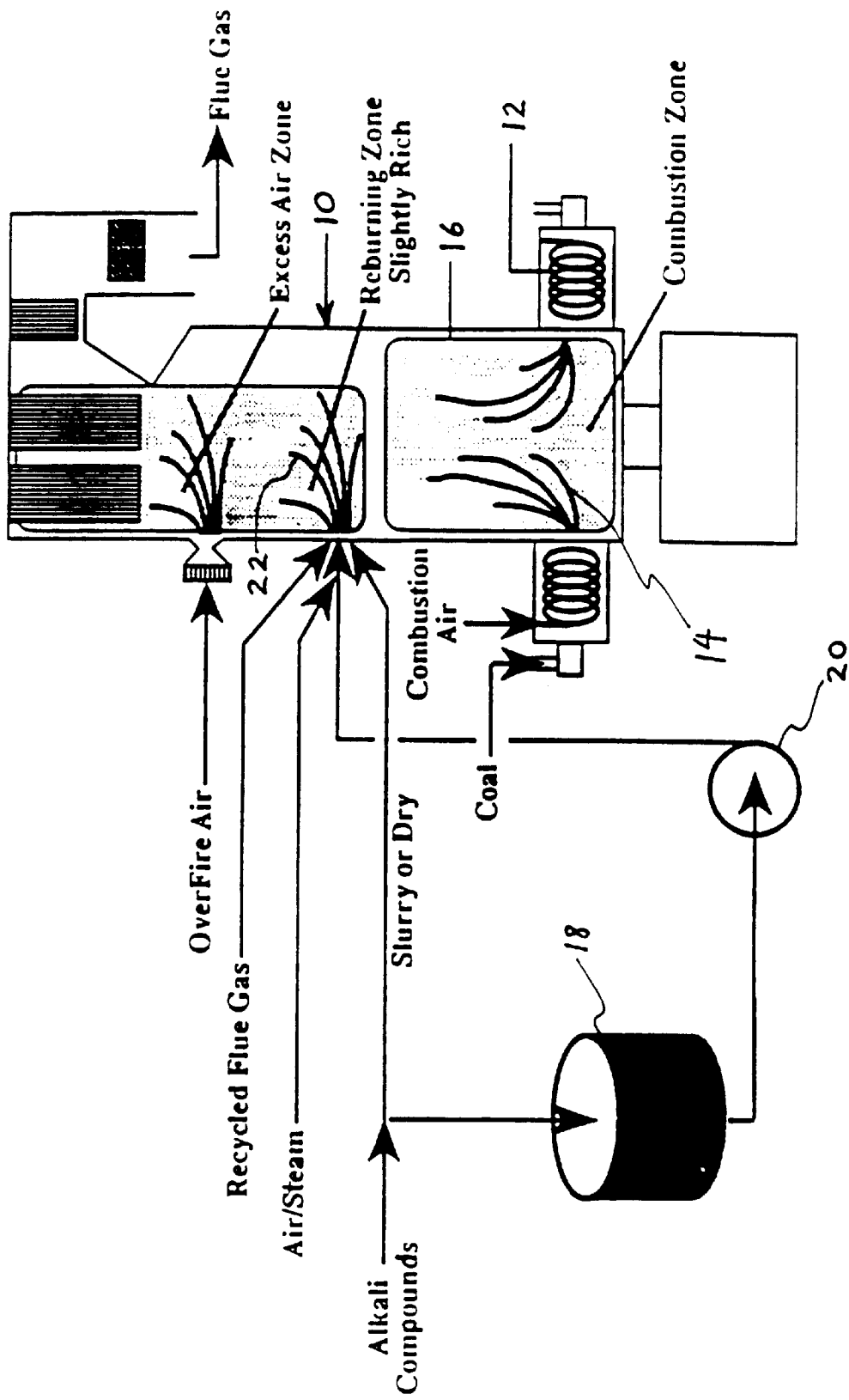
FIG. 1 is a process flow diagram illustrating the method and system of the invention for the reduction of nitrogen oxide and sulfur oxide emissions from the combustion of carbonaceous fuels using coal water slurry as a reburn fuel.

The present invention is an improved method and system for the reduction of nitrogen oxide and sulfur oxide emissions from the combustion of carbonaceous fuels that contain nitrogen and sulfur. The method of the present invention includes two techniques, one for the reduction of nitrogen oxides and one for the capture and removal of sulfur oxides from combustion flue gases. The technique for reducing nitrogen oxide emissions may be used alone, or the two techniques may be integrated to reduce both the oxides of sulfur and nitrogen.

In general, the method of the invention includes the injection of a coal water slurry (CWS) into a combustion flue gas to partially oxidize the coal water slurry to produce reducing gas species that convert flue gas nitrogen oxides to diatomic nitrogen. The coal water slurry is injected as a reburn fuel into a combustion furnace above or downstream of conventional coal burners at a rate to effect a reducing or gasification reburn zone in the furnace. The flue gases from the lower burners containing nitrogen oxides must pass through the reducing reburn zone, where the reducing gas species convert the incoming $NO_x$ to diatomic nitrogen. Above or further downstream from the reducing reburn zone, overfire air is added to create an overfire air zone having an excess air condition to completely combust the flue gas leaving the reburn zone.

Optionally, sulfur dioxide may also be removed from the flue gas by adding alkali compounds to the coal water slurry before injecting the slurry into the furnace, or by injecting the alkali compounds separately into a reducing reburn zone in the furnace created by the partial oxidation of the coal water slurry fuel. The alkali compounds will react with the sulfur oxides to produce alkali sulfites and sulfates, which can then be removed in a downstream particulate removal device.

The method of the invention may be applied to a variety of combustion furnaces, including wall-fired, vertically-fired, tangentially-fired, cyclone-fired, and stoker-fired furnaces, as well as other furnaces used in industrial and electric utility boiler applications, cell burner-fired furnaces, wet bottom boilers, and vertically-fired and wall-fired dry bottom boilers, wherein the primary combustion zone at the conventional burner level is at least about 2400° F. The present coal water slurry reburn technique for reducing $NO_x$ emissions from carbonaceous fuel fired furnaces may be easily retro-fitted to existing industrial and electric utility boilers, and may also be applied to new boiler furnace installations.

The concept of the invention is based on the fact that a reducing furnace condition will convert nitrogen oxides to diatomic nitrogen, and under the right furnace conditions, once the diatomic nitrogen is produced very little will be reconverted back to the nitrogen oxide form. The invention is further based on the fact that alkali compounds, under the right furnace conditions, will react with sulfur dioxide and trioxide to form alkali sulfites/sulfates, which may be removed in particulate form in a downstream flue gas particulate removal device such as an electrostatic precipitator or bag house.

Oxides of nitrogen are produced primarily from fuel bound nitrogen and from thermal conditions of high temperature, greater than about 2700° F., as well as with an oxidizing flue gas condition such as that found with conventional coal-fired burners. When coal water slurry is used as a reburn fuel to reduce $NO_x$ emissions, it is injected into the boiler furnace at a cooler furnace location, above or downstream from the conventional coal burners being operated in an overall excess air combustion condition in a primary burner combustion zone. The reburn fuel can be injected into the furnace, such as by spraying with a dual-fluid atomizer nozzle, without the need for firing the reburn fuel by a separate reburn burner during injection. The coal water slurry reburn fuel is injected at a rate to effect a reducing or gasification reburn zone in the furnace. The reburn fuel rate is set to effect a stoichiometric air condition of about 70% to 90% in the furnace reburn zone. The furnace temperature in the reburn zone above the coal burners where the reburn fuel is injected is in the range from about 2400° F. to 3200° F., and more preferably in the range from about 2600° F. to 3000° F. The flue gases from the lower burners containing nitrogen oxides must pass through the reducing reburn zone, and in doing so the reducing gas species convert about 30% to 80%, preferably about 50% to 70%, of the incoming $NO_x$ to diatomic nitrogen according to the following example equations:

$$[CH_2]^{++} + 2NO \rightarrow CO + H_2O + N_2; \qquad (1)$$

$$2CO + 2NO \rightarrow 2CO_2 + N_2; \text{ and} \qquad (2)$$

$$2H_2 + 2NO \rightarrow 2H_2O + N_2. \qquad (3)$$

The degree of $NO_x$ reduction depends on reburn zone stoichiometry, fuel reactivity, and residence time at the temperature in the reducing reburn zone. The reburn zone is at a lower temperature than the primary burner combustion zone, because some of the liberated heat from combustion of fuel in the burners is absorbed by furnace waterwall tubes as the flue gases pass upward through the furnace. Therefore, once the $NO_x$ is converted to diatomic nitrogen in the reburn zone, very little is reconverted back to $NO_x$ in the upper overfire air zone, which is also cooler than the primary burner combustion zone.

Figure 2:
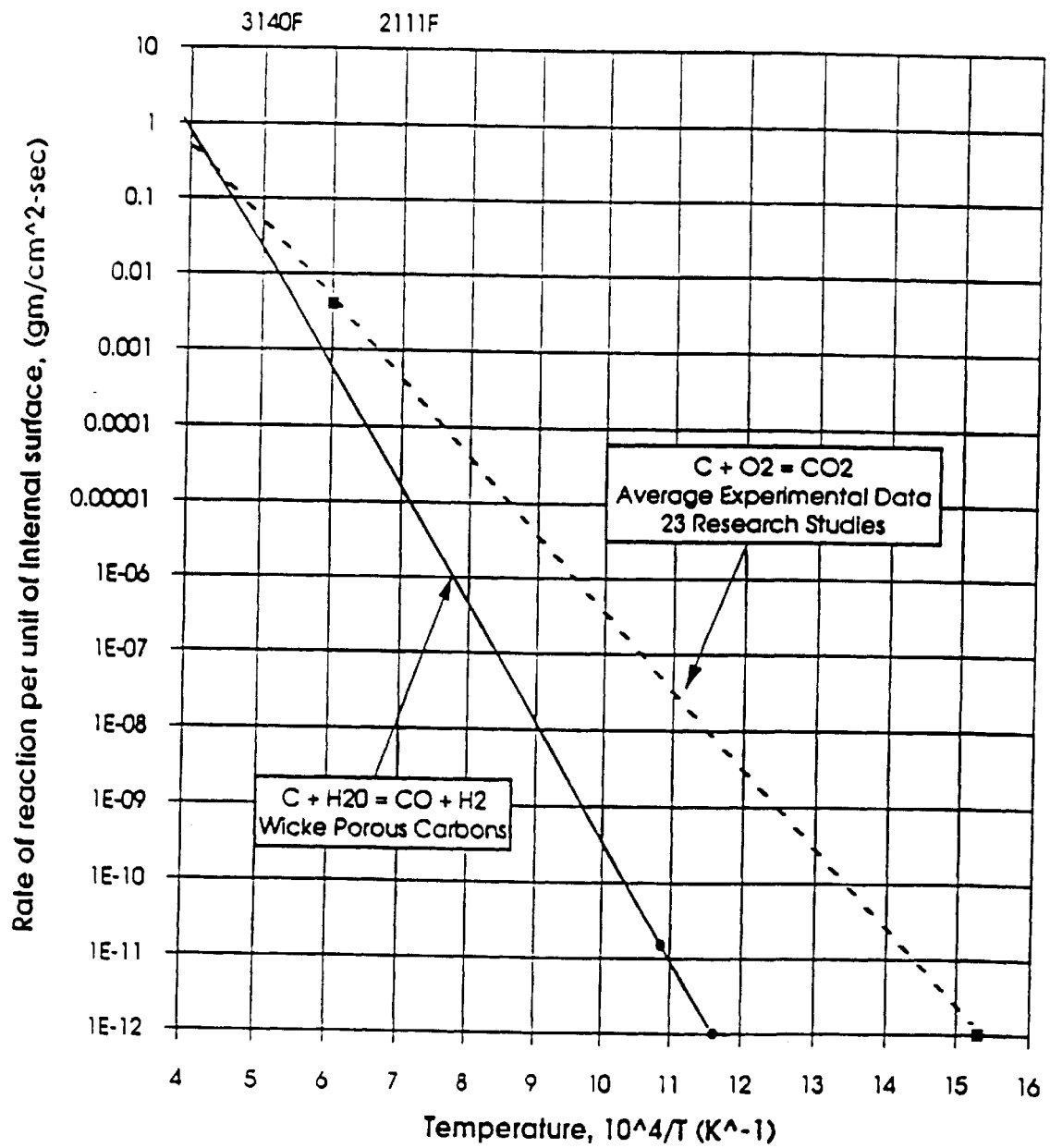
FIG. 2 is a graph comparing the kinetic rates of reaction for the carbon-water reaction and the carbon-oxygen reaction in a reducing zone environment.

One of the benefits of using coal water slurry as a reburn fuel in the present invention is that at the reburn zone temperature level, in the range of about 2400° F. to 3200° F., the carbon-water reaction kinetics are about as fast as the kinetics for the carbon-oxygen reaction. This is shown in FIG. 2, which is a graph comparing the kinetic rates of reaction for the carbon-oxygen and carbon-steam reactions in a reducing zone environment. The graph of FIG. 2 was adapted from M. A. Elliott, *Chemistry of Coal Utilization*, Second Supplementary Volume, pp. 1272–1277 (1981), the disclosure of which is incorporated by reference. A faster rate of decomposition and gasification of the coal is thus provided, making less reactive coals more reactive. With the faster gasification rates, the residence time of the flue gases in the reducing reburn zone is increased, thus effecting increased reduction of nitrogen oxides and also improving fuel carbon conversion. The effect of the carbon-water reaction to speed up coal oxidation is well known in the coal gasification technology field.

A sulfur dioxide removal technique may also be added to the coal water slurry, reburn fuel technique of the present invention. This is accomplished by adding an alkali sorbent from the class consisting of calcium, magnesium, sodium, and potassium compounds. The compounds of these alkali elements that are effective reactants with sulfur dioxide include hydroxides, oxides, acetates, carbonates, bicarbonates, and mixtures thereof. Non-limiting examples of suitable alkali compounds that may be used include calcium carbonate, calcium oxide, calcium bicarbonate, calcium hydroxide, magnesium oxide, magnesium hydroxide, sodium carbonate, sodium bicarbonate, sodium hydroxide, sodium acetate, potassium hydroxide, potassium acetate, potassium carbonate, and the like. Particularly preferred alkali sorbent compounds are calcium carbonate, calcium oxide, and calcium hydroxide. The alkali sorbent used may be a single compound, or any combination of the above compounds of alkali elements in a variety of mixtures.

The alkali compounds may be added to the coal water slurry mixture and then injected into the furnace with the slurry fuel, or may be injected separately into the reducing reburn zone created by the injection of the coal water slurry fuel. If the alkali compounds are injected separately into the reducing reburn zone, either an alkali solution/slurry mixture can be injected into the furnace through a dual-fluid atomizer nozzle, or a dry mixture can be used in an air, nitrogen, steam, or inert gas pneumatic conveyance system for transporting the alkali compounds to a nozzle for injection into the furnace.

The smaller the particle size of the alkali compound, the more surface area that is available for sulfur oxide reaction and capture by the particle. Therefore, the alkali particle size will be composed of a range of particles with a top size of no greater than about 100 mesh, and preferably with a top size no greater than about 200 mesh.

Whereas alkalis have been injected into oxidizing zones in a boiler furnace for the capture of sulfur oxides, the prior art does not teach the injection of alkalis into a reducing reburn zone, nor as an admixture in a coal water slurry fuel as in the present invention. By injecting the alkali into a reducing reburn zone, the initial reaction of the alkali will be with both hydrogen sulfide and sulfur dioxide, and not just sulfur dioxide as in an oxidizing zone.

In the reducing reburn zone, alkali sulfides, sulfites and sulfates will be formed in accord with the following example equations:

$$CaCO_3 + H_2S \rightarrow CaS + H_2O + CO_2; \quad (4)$$

$$CaCO_3 + SO_2 \rightarrow CaSO_3 + CO_2; \quad (5)$$

$$CaCO_3 + SO_2 + \tfrac{1}{2}O_2 \rightarrow CaSO_4 + CO_2; \text{ and} \quad (6)$$

$$CaCO_3 + SO_3 \rightarrow CaSO_4 + CO_2 \quad (7)$$

It is the tendency of sulfites/sulfates such as calcium sulfites/sulfates to plug the alkali compound particle pores such as in calcium compounds, so sulfur dioxide capture primarily occurs on the particle surface. Alkali sulfide molecules such as calcium sulfide are not as large as alkali sulfite/sulfate molecules and therefore the plugging of the pores of the alkali compound particles will not be as rapid, and better alkali utilization for sulfur oxide capture should occur.

Further, whereas the capture of sulfur dioxide with calcium additives best occurs at a temperature in a range from about 1400° F. to 1600° F., and would not usually occur at temperatures above about 2000° F., the reaction of calcium compounds with hydrogen sulfide is favored at higher temperatures of about 2400° F. to 3200° F. under reducing furnace conditions. While the sulfide will be converted to a sulfur dioxide when the particle enters the excess air condition of the overfire air zone in the furnace, the sulfur dioxide may be trapped in the interstices of the calcium particle long enough to be retained until the particle reaches the optimum temperature zone of about 1400° F. to 1700° F. for sulfur dioxide capture, thus also improving calcium utilization.

One way to improve alkali utilization, e.g. calcium utilization, is to inject very small particles into a furnace. By injecting the alkali compound particles in a slurry form, the rapid evaporation of water from the particle void interstices as the particle enters the hot furnace will fracture the particle and increase the overall alkali surface area for subsequent reaction with the sulfur oxides. This phenomenon should also improve calcium utilization. Based on prior dry sorbent injection technology results, it is expected that with an alkali to coal sulfur mole ratio of from about 0.5 to 3, that about 40 to 70 percent of the sulfur oxides produced from the combustion of coal may be captured with this technique.

Further, with the injection of calcium compounds, the furnace temperature at the point of injection is very critical to prevent initiation of particle melting which creates a glazed particle surface. A glazed particle surface becomes less reactive for the capture of sulfur oxides. Normally, the furnace temperature zone where calcium compounds have historically been injected for sulfur oxides capture is approximately 2000° F. to 2200° F. By injecting calcium compounds with water, the point of injection can be at a higher flue gas temperature of about 2400° F. to 2600° F. For example, using calcium carbonate as the alkali compound, before the compound will decompose to calcium oxide or react with sulfur gaseous species, the water from the surface of the particle must evaporate, and this evaporation, which is an endothermic process, will cool the particle. In the case of calcium carbonate, after evaporation of the water, the decomposition to the oxide form which occurs is also an endothermic reaction, further cooling the particle. Still further, since coal ash is injected with the calcium carbonate, the initial ash fusion temperature of the calcium-ash mixture may be higher than that for the calcium oxide alone with the end effect of inhibiting "dead burning" or glazing of the calcium oxide-ash particle surface.

Another benefit of adding the alkali sorbent with the fuel in the present invention is that heat transfer for the generation of steam is not reduced. In conventional in-furnace alkali injection systems, the alkali is not injected with a fuel, and the resultant alkali particle color is very white. Because of this, only a slight covering of these white particles on boiler tube surfaces increases the reflectivity of the boiler tubes and heat transfer for the generation of steam is reduced. Thus, with conventional in-furnace alkali injection systems, boiler soot-blowing must be increased and at times dramatically, to maintain design boiler heat transfer rates.

Assuming coal to be the primary carbonaceous fuel fired in an industrial or utility boiler furnace, and a prepared coal water slurry fuel to be fired as the reburn fuel, the process flow diagram of FIG. 1 shows a preferred system for carrying out the method of the invention for the reduction of nitrogen oxide and sulfur oxide emissions from combustion flue gases.

Referring to FIG. 1, a carbonaceous fuel such as pulverized or ground coal is conveyed to a boiler furnace 10 having primary coal-fired burners 12 where combustion air is added under excess air conditions. In addition to coal, the carbonaceous fuel may also be selected from the group of petroleum coke, bitumen, fuel oil, and non-aqueous or aqueous mixtures thereof. The coal is combusted, which produces hot combustion flue gases 14 in a combustion zone that contains products of combustion, including gaseous species of the oxides of nitrogen and sulfur. About 75 to 90 percent of the heat input to boiler furnace 10 is supplied by coal-fired burners 12. The combustion flue gases 14 at temperatures of about 3200° F. or greater flow upward through boiler furnace 10, cooling as they rise due to radiant and convective heat transfer to a set of furnace tubes 16 located around the walls of boiler furnace 10. When the rising flue gas temperature cools down to the range of about 2400° F. to 3200° F., and more preferably down to the range of about 2600° F. to 3000° F., the coal water slurry reburn fuel may be injected into the furnace where these temperature zones exist to create a reburning zone that is slightly fuel rich.

Prepared coal water slurry from a storage tank 18, with the coal having a top particle size up to about 100 mesh and preferably with a top particle size up to about 200 mesh, is directed to a slurry pump 20. The coal water slurry is pumped to an injection means and sprayed into boiler furnace 10 to form the reducing reburn zone. The injection means is preferably a dual-fluid atomizer nozzle that uses low weight ratios of air, steam, natural gas, nitrogen gas, an inert gas (such as a combination of $CO_2$ and nitrogen from an inert gas generator), or mixtures thereof, as the atomizing media for the coal water slurry. Other injection means may also be utilized, such as a mechanical nozzle that sprays the coal water slurry into the furnace. The ratio of the atomizing media to the coal water slurry reburn fuel is about 0.05 to 1 lb/lb, and preferably about 0.1 to 0.4 lb/lb.

The coal water slurry coal solids content may range from about 40 to 65 weight percent, preferably from about 45 to 55 weight percent, with the remainder being water (e.g., 60 to 35 weight percent water). The coal water slurry may be prepared by any of the conventional methods known to those of ordinary skill in the art and from a variety of sources. For example, the coal water slurry can be produced by using coal fines from coal preparation plant pond impoundments, by using prepared coal from coal preparation plant waste gob piles, by using the coal fines fraction from coal preparation plants, or by using a sized, ground, or micronized coal produced from wet or dry grinding equipment.

The slurry and atomizing media pressure at the dual-fluid nozzle tip may range from about 50 to 150 psig depending on the degree of atomization required and the penetration across the furnace desired. One of the unique aspects of using coal water slurry as a reburn fuel is that with the dual-fluid atomizer nozzle, penetration for long distances across the furnace is possible and good mixing with the rising flue gas results. This obviates the need for flue gas recycle, as is required when using fine pulverized coal as a reburn fuel. With fine pulverized coal reburning, the recycling of flue gas is required to provide for adequate furnace penetration and mixing with the rising flue gas from the primary combustion zone to create a defined reburn zone. Notwithstanding the above, the use of recycled flue gas with the coal water slurry injection may be employed, as shown in FIG. 1, in conjunction with the dual-fluid atomizer nozzle as an injection/dispersion media to provide for added in-furnace mixing of the reburn fuel with rising furnace flue gases entering the reburn zone.

Figure 3:
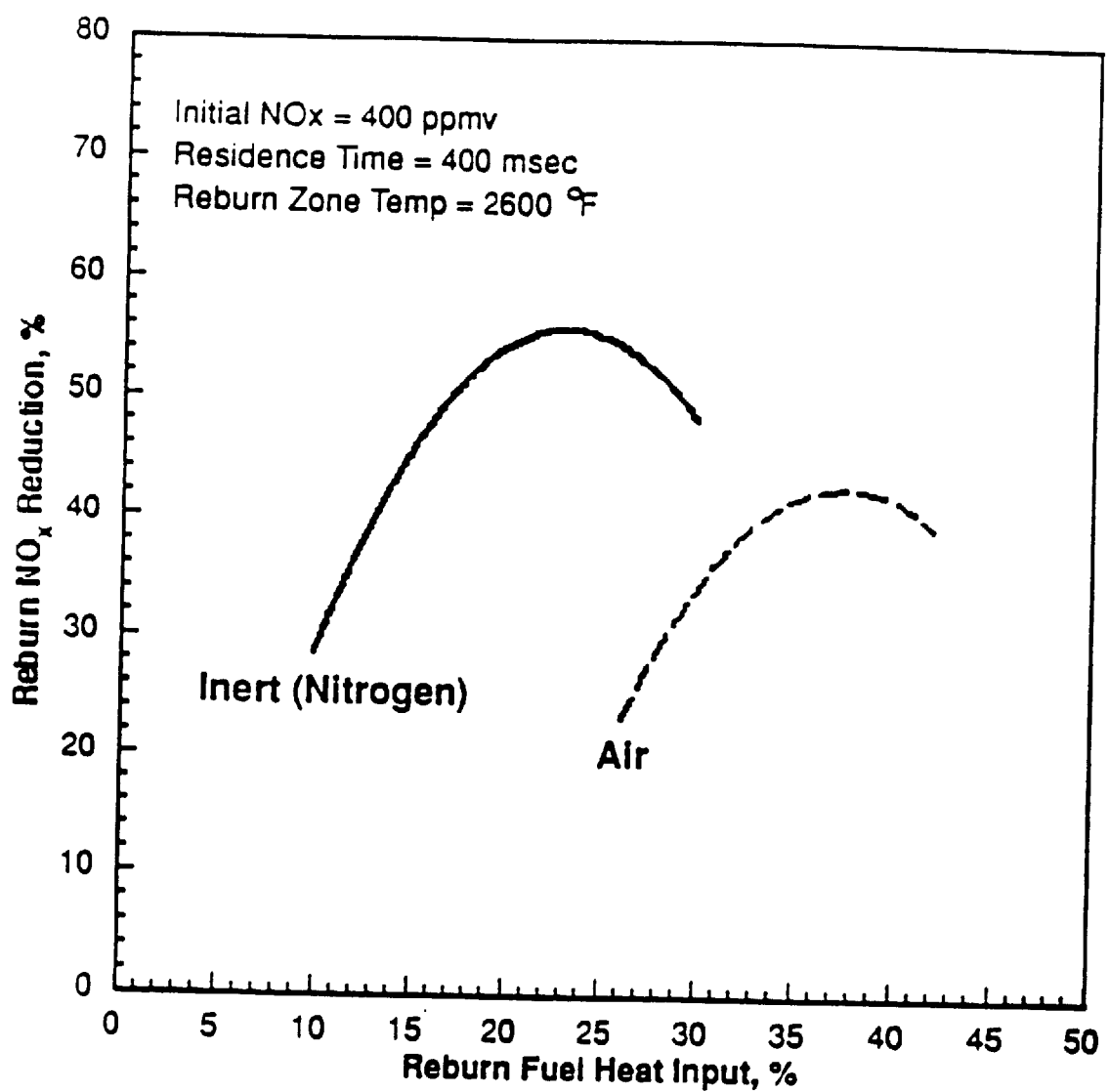
FIG. 3 is a graph showing the injection media effect on reburn $NO_x$ reduction performance, in particular the deleterious effect of adding air with a reburn fuel.

Further, the ratio of air, if air is used as the atomizing media for injection of the coal water slurry, is kept to a minimum. Preferably, about 1 pound or less of air per pound of CWS is used in the atomizing media of the present invention, as opposed to using air at a stoichiometric ratio of 0.4 which corresponds to approximately 3.5 lb air/lb coal slurry as in prior conventional techniques. The more air that is added with the reburn fuel, the greater the fuel requirement per unit of nitrogen oxides reduced. FIG. 3 is a graph showing the injection media effect on reburn $NO_x$ reduction performance, in particular the deleterious effect of adding air with a reburn fuel, compared to using nitrogen injection with the reburn fuel. Injection with nitrogen lowers the required amount of reburn fuel and results in higher $NO_x$ reduction performance compared to injection with air. The greater the air to reburn fuel ratio, the greater the required reburn fuel and the lower the $NO_x$ reduction performance. Thus, when air is used as the atomizing media, the use of low weight ratios of air to coal water slurry (e.g., up to about 1 lb air/lb CWS) is preferred over the use of high weight ratios of air to CWS as the atomizing media in the present invention.

The rate of coal water slurry fuel injection is set to achieve a specific stoichiometric air condition in the reburn zone. A reburn zone combustion air stoichiometry in the range of about 70 to 90 percent is desired, and more preferably the reburn zone combustion air stoichiometry will be in the range of about 85 to 90 percent. These stoichiometric air percentages relate to a partial oxidation or reducing condition in the furnace reburn zone.

Following the injection of the coal water slurry into the reducing reburn zone it is desirous that the residence time of the flue gases in the reburn zone under a reducing condition be in the range of about 0.2 to 1.5 seconds, and more preferably in the range of about 0.4 to 1 second, prior to being contacted with overfire air. Under these reducing conditions with adequate residence time in the reburn zone as stated, $NO_x$ emissions may be reduced by about 30% to 80%, and preferably by about 50% to 70%, compared to the same boiler using conventional excess air primary burners only to fire all of the fuel heat input into the boiler furnace.

Referring again to FIG. 1, overfire air is directed through an introducing means such as a blower or other suitable device into an excess air zone above the reburn zone. The overfire air is blown into boiler furnace 10 at a point high enough to provide for the desired reducing condition residence time, and in such a manner as to provide for good mixing and combustion of the uprising reburn fuel gases 22 that are generated in the reburn zone. Normally, enough overfire air is added to increase the stoichiometric air addition to about 110% to 130% of that required for complete combustion of the fuel introduced into boiler furnace 10.

Optionally with the coal water slurry reburn technique shown in FIG. 1, alkali compounds such as calcium carbonate may be added for the capture of sulfur oxides. The alkali compounds may be mixed with the coal water slurry in storage tank 18 before firing, or may be directed to an injection means such as an injection nozzle and injected separately into the reburn zone either in a slurry form or in a dry form using a pneumatic carrier gas such as nitrogen, steam or air. The alkali compounds will react with the sulfur oxides in reburn fuel gases 22. With calcium to coal sulfur mole ratios of from about 0.5 to 3, sulfur oxides may be reduced by about 40 to 70 percent. The captured alkali sulfites and/or sulfates may be removed from the flue gas in a particulate removal device, such as an electrostatic precipitator or bag house, located downstream of boiler furnace 10.

The following examples set forth test runs of the method according to the present invention. These examples are intended to be purely exemplary and should not be viewed as limiting the scope of the invention.

EXAMPLES 1–7

The $NO_x$ reduction of combustion flue gases was tested according to the method of the present invention using a coal water slurry produced from a Western Kentucky coal. Table 1 below shows the stoichiometric air ratio and residence time for the flue gases in the reburn zone for each of Examples 1–7, as well as the injection temperature and inlet $NO_x$ concentration. The coal used to make the coal water slurry (50% coal and 50% water) had a particle size of 70% less than 200 mesh (210 micron diameter), and was fired in the reburn zone at a primary to reburn heat input fuel ratio of 80/20. Above the reburn zone, overfire air was added to create an excess stoichiometric air condition of normally 115%, to completely combust the flue gas leaving the reburn zone. The degree of $NO_x$ reduction using the coal water slurry technique of the invention is also shown in Table 1 for Examples 1–7.

TABLE 1

$NO_x$ Reduction using a 50/50 Coal/Water Slurry as a Reburn Fuel

| Example | Reburn Zone Stoichiometric Air Ratio | Reburn Zone Residence Time (sec.) | Injection Temperature (° F.) | Inlet $NO_x$ Concentration (ppmv @ 3% $O_2$) | $NO_x$ Reduction (%) |
| --- | --- | --- | --- | --- | --- |
| 1 | 0.990 | 0.42 | 2815 | 1334 | 32.9 |
| 2 | 0.935 | 0.42 | 2815 | 1334 | 53.7 |
| 3 | 0.880 | 0.42 | 2815 | 1334 | 64.9 |
| 4 | 0.836 | 0.42 | 2815 | 1334 | 68.6 |
| 5 | 0.934 | 0.53 | 2700 | 1121 | 57.2 |
| 6 | 0.878 | 0.53 | 2700 | 1121 | 72.8 |
| 7 | 0.823 | 0.53 | 2700 | 1121 | 77.0 |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States letters patent is:

1. A method for the reduction of nitrogen oxide emissions from carbonaceous fuel combustion flue gases, comprising the steps of:
   (a) injecting a coal water slurry as a reburn fuel into a combustion furnace at a point where the temperature of the flue gases from a carbonaceous fuel burner is in a range from greater than about 2700° F. to about 3200° F., the flue gases including oxides of nitrogen, the fuel burner operating under excess air combustion conditions and being fired at a rate to provide for about 70 to about 90 percent of the heat input into the furnace, the coal water slurry comprising about 40 to about 65 weight percent coal being injected as a spray at a rate of about 10 to about 30 percent of the heat input into the furnace to provide a stoichiometric air condition of about 70 to about 90 percent of that needed for the complete combustion of all fuel in the furnace;
   (b) creating a reducing reburn zone in the furnace where the coal water slurry is injected to form reducing gas species that will react with the oxides of nitrogen to form diatomic nitrogen, thereby reducing the concentration of nitrogen oxides in the flue gases; and
   (c) introducing overfire air into the furnace to bring the total stoichiometric air addition up to a level of about 110 to about 130 percent of that required to combust all of the fuel in the furnace, thereby providing for the complete combustion of reburn fuel gases created by the injection of the coal water slurry into the furnace, wherein the overfire air is introduced into the furnace at a point such that the flue gases have a residence time within the reburn zone of about 0.2 to about 1.5 seconds prior to being contacted with the overfire air.

2. The method of claim 1, wherein the coal water slurry is injected with an atomizing media through a dual-fluid atomizer nozzle.

3. The method of claim 2, wherein the atomizing media is selected from the group consisting of air, steam, natural gas, nitrogen gas, an inert gas, and mixtures thereof.

4. The method of claim 1, wherein the carbonaceous fuel is selected from the group consisting of coal, petroleum coke, bitumen, fuel oil, non-aqueous mixtures thereof, and aqueous mixtures thereof.

5. The method of claim 1, wherein the coal water slurry is produced from a source selected from the group consisting of coal fines from coal preparation plant pond impoundments, prepared coal from coal preparation plant waste gob piles, a coal fines fraction from a coal preparation plant, and a sized, ground, or micronized coal produced from wet or dry grinding equipment.

6. The method of claim 1, wherein the coal water slurry is injected into the combustion furnace at a point where the temperature of the flue gases is in a range from greater than about 2700° F. to about 3000° F.

7. The method of claim 1, wherein the coal water slurry comprises about 60 to about 35 weight percent of water.

8. The method of claim 7, wherein the coal has a particle size up to about 100 mesh.

9. The method of claim 7, wherein the coal has a particle size up to about 200 mesh.

10. The method of claim 1, wherein the coal water slurry is injected into the furnace at a rate sufficient to provide for a stoichiometric air condition in the reburn zone of about 85 to about 90 percent of that needed for the complete combustion of all fuel in the furnace.

11. The method of claim 1, wherein the flue gases have a residence time within the reburn zone of about 0.4 to about 1 second prior to being contacted with the overfire air.

12. The method of claim 2, wherein recycled flue gas is used in conjunction with the dual-fluid atomizer nozzle as an injection/dispersion media to provide for added mixing of the coal water slurry with rising flue gases entering the reducing reburn zone.

13. The method of claim 2, wherein the ratio of the atomizing media to the coal water slurry reburn fuel is about 0.05 to about 1 lb/lb.

14. The method of claim 2, wherein the ratio of the atomizing media to the coal water slurry reburn fuel is about 0.1 to about 0.4 lb/lb.

15. The method of claim 1, wherein the combustion furnace is selected from the group consisting of a tangentially-fired furnace, a cyclone-fired furnace, a wall-fired furnace, a cell burner-fired furnace, a stoker-fired furnace, and other furnaces used in industrial and electric utility boiler applications.

16. A method for the reduction of nitrogen oxide and sulfur oxide emissions from carbonaceous fuel combustion flue gases, comprising the steps of:

(a) injecting a coal water slurry as a reburn fuel into a combustion furnace at a point where the temperature of the flue gases from a carbonaceous fuel burner is in a range from greater than about 2700° F. to about 3200° F., the flue gases including oxides of sulfur and nitrogen, the fuel burner operating under excess air combustion conditions and being fired at a rate to provide for about 70 to about 90 percent of the heat input into the furnace, the coal water slurry comprising about 40 to about 65 weight percent coal being injected as a spray at a rate of about 10 to about 30 percent of the heat input into the furnace to provide a stoichiometric air condition of about 70 to about 90 percent of that needed for the complete combustion of all fuel in the furnace;

(b) creating a reducing reburn zone in the furnace where the coal water slurry is injected to form reducing gas species that will react with the oxides of nitrogen to form diatomic nitrogen, thereby reducing the concentration of nitrogen oxides in the flue gases in an amount from about 30 to about 80 percent;

(c) adding an alkali compound to the reducing reburn zone in the furnace at a rate to provide for an alkali to sulfur mole ratio of about 0.5 to about 3, the alkali compound reacting with the oxides of sulfur to form solid reaction products; and (d) introducing overfire air into the furnace to bring the total stoichiometric air addition up to a level of about 110 to about 130 percent of that required to combust all of the fuel in the furnace, thereby providing for the complete combustion of reburn fuel gases created by the injection of the coal water slurry into the furnace, wherein the overfire air is introduced into the furnace at a point such that the flue gases have a residence time within the reburn zone of about 0.2 to about 1.5 seconds prior to being contacted with the overfire air.

17. The method of claim 16, further comprising the step of removing the solid reaction products in a particulate removal device downstream of the furnace.

18. The method of claim 16, wherein the coal water slurry is injected with an atomizing media through a dual-fluid atomizer nozzle.

19. The method of claim 18, wherein the atomizing media is selected from the group consisting of air, steam, natural gas, nitrogen gas, an inert gas, and mixtures thereof.

20. The method of claim 16, wherein the carbonaceous fuel is selected from the group consisting of coal, petroleum coke, bitumen, fuel oil, non-aqueous mixtures thereof, and aqueous mixtures thereof.

21. The method of claim 16, wherein the coal water slurry comprises about 60 to about 35 weight percent of water.

22. The method of claim 16, wherein the coal has a particle size up to about 100 mesh.

23. The method of claim 16, wherein the coal has a particle size up to about 200 mesh.

24. The method of claim 16, wherein the alkali compounds are added to the coal water slurry prior to being injected into the combustion furnace.

25. The method of claim 16, wherein the alkali compounds are injected separately from the coal water slurry into the reducing reburn zone.

26. The method of claim 16, wherein the alkali compounds have a particle size up to about 100 mesh.

27. The method of claim 16, wherein the alkali compounds have a particle size up to about 200 mesh.

28. The method of claim 25, wherein the alkali compounds are injected separately from the coal water slurry into the reducing reburn zone in a wet form using an alkali solution/slurry mixture that is injected into the furnace through a dual-fluid atomizer nozzle, or in a dry form using a pneumatic conveyance system for transporting the alkali compounds to a nozzle for injection into the furnace.

29. The method of claim 16, wherein the coal water slurry is injected into the furnace at a rate sufficient to provide for a stoichiometric air condition in the reburn zone of about 85 to about 90 percent of that needed for the complete combustion of all fuel in the furnace.

30. The method of claim 16, wherein the flue gases have a residence time within the reburn zone of about 0.4 to about 1 second prior to being contacted with the overfire air.

31. The method of claim 16, wherein the alkali compound is selected from the group consisting of hydroxides, oxides, acetates, carbonates, bicarbonates, and mixtures thereof.

32. The method of claim 31, wherein the alkali compound includes alkali metal elements selected from the group consisting of calcium, magnesium, sodium, potassium, and combinations thereof.

33. The method of claim 16, wherein the alkali compound is selected from the group consisting of calcium carbonate, calcium oxide, and calcium hydroxide.

34. The method of claim 18, wherein recycled flue gas is used in conjunction with the dual-fluid atomizer nozzle as an injection/dispersion media to provide for added mixing of the coal water slurry with rising flue gases entering the reducing reburn zone.

35. The method of claim 18, wherein the ratio of the atomizing media to the coal water slurry reburn fuel is about 0.05 to about 1 lb/lb.

36. The method of claim 18, wherein the ratio of the atomizing media to the coal water slurry reburn fuel is about 0.1 to about 0.4 lb/lb.

37. The method of claim 16, wherein the combustion furnace is selected from the group consisting of a tangentially-fired furnace, a cyclone-fired furnace, a wall-fired furnace, a cell burner-fired furnace, a stoker-fired furnace, and other furnaces used in industrial and electric utility boiler applications.

38. A system for the reduction of nitrogen oxide emissions from carbonaceous fuel combustion flue gases, comprising:

(a) means for injecting a coal water slurry as a reburn fuel into a combustion furnace at a point where the temperature of the flue gases from a carbonaceous fuel burner is in a range from greater than about 2700° F. to about 3200° F., the flue gases including oxides of nitrogen, the fuel burner operating under excess air combustion conditions and being fired at a rate to provide for about 70 to about 90 percent of the heat input into the furnace, the coal water slurry comprising about 40 to about 65 weight percent coal being injected as a spray at a rate of about 10 to about 30 percent of the heat input into the furnace to provide a stoichiometric air condition of about 70 to about 90 percent of that needed for the complete combustion of all fuel in the furnace, whereby a reducing reburn zone is created in the furnace where the coal water slurry is injected to form reducing gas species that will react with the oxides of nitrogen to form diatomic nitrogen and reduce the concentration of nitrogen oxides in the flue gases; and (b) means for introducing overfire air into the furnace to bring the total stoichiometric air addition up to a level of about 110 to about 130 percent of that required to combust all of the fuel in the furnace, thereby providing for the complete combustion of reburn fuel gases created by the injection of the coal water slurry into the furnace, wherein the overfire air is introduced into the furnace at a point such that the flue gases have a residence time within the reburn zone of about 0.2 to about 1.5 seconds prior to being contacted with the overfire air.

39. The system of claim 38, wherein the coal water slurry is injected with an atomizing media through a dual-fluid atomizer nozzle.

40. The system of claim 38, wherein the combustion furnace is selected from the group consisting of a tangentially-fired furnace, a cyclone-fired furnace, a wall-fired furnace, a cell burner-fired furnace, a stoker-fired furnace, and other furnaces used in industrial and electric utility boiler applications.

41. A system for the reduction of nitrogen oxide and sulfur oxide emissions from carbonaceous fuel combustion flue gases, comprising:
(a) means for injecting a coal water slurry as a reburn fuel into a combustion furnace at a point where the temperature of the flue gases from a carbonaceous fuel burner is in a range from greater than about 2700° F. to about 3200° F., the flue gases including oxides of sulfur and nitrogen, the fuel burner operating under excess air combustion conditions and being fired at a rate to provide for about 70 to about 90 percent of the heat input into the furnace, the coal water slurry comprising about 40 to about 65 weight percent coal being injected as a spray at a rate of about 10 to about 30 percent of the heat input into the furnace to provide a stoichiometric air condition of about 70 to about 90 percent of that needed for the complete combustion of all fuel in the furnace, whereby a reducing reburn zone is created in the furnace where the coal water slurry is injected to form reducing gas species that will react with the oxides of nitrogen to form diatomic nitrogen and reduce the concentration of nitrogen oxides in the flue gases in an amount from about 30 to about 80 percent;
(b) means for adding an alkali compound to the reducing reburn zone in the furnace at a rate to provide for an alkali to sulfur mole ratio of about 0.5 to about 3, the alkali compound reacting with the oxides of sulfur to form solid reaction products; and
(c) means for introducing overfire air into the furnace to bring the total stoichiometric air addition up to a level of about 110 to about 130 percent of that required to combust all of the fuel in the furnace, thereby providing for the complete combustion of reburn fuel gases created by the injection of the coal water slurry into the furnace, wherein the overfire air is introduced into the furnace at a point such that the flue gases have a residence time within the reburn zone of about 0.2 to about 1.5 seconds prior to being contacted with the overfire air.

42. The system of claim 41, wherein the coal water slurry is injected with an atomizing media through a dual-fluid atomizer nozzle.

43. The system of claim 41, further comprising means for adding the alkali compound to the coal water slurry prior to being injected into the combustion furnace.

44. The system of claim 41, further comprising means for injecting the alkali compound separately from the coal water slurry into the reducing reburn zone.

45. The system of claim 44, wherein the means for injecting the alkali compound separately from the coal water slurry into the reducing reburn zone include either a dual-fluid atomizer nozzle for injecting an alkali solution/slurry mixture into the furnace, or a pneumatic conveyance system for transporting the alkali compound in a dry form to a nozzle for injection into the furnace.

46. The system of claim 41, wherein the combustion furnace is selected from the group consisting of a tangentially-fired furnace, a cyclone-fired furnace, a wall-fired furnace, a cell burner-fired furnace, a stoker-fired furnace, and other furnaces used in industrial and electric utility boiler applications.

47. A method for the reduction of nitrogen oxide emissions from carbonaceous fuel combustion flue gases, comprising the steps of:
(a) injecting a coal water slurry as a reburn fuel with an atomizing media through a dual-fluid atomizer nozzle into a combustion furnace at a point where the temperature of the flue gases from a carbonaceous fuel burner is in a range from about 2400° F. to about 3200° F., the ratio of the atomizing media to the coal water slurry reburn fuel being about 0.05 to about 1 lb/lb, the flue gases including oxides of nitrogen and sulfur, the fuel burner operating under excess air combustion conditions and being fired at a rate to provide for about 70 to about 90 percent of the heat input into the furnace, the coal water slurry comprising about 40 to about 65 weight percent coal being injected as a spray at a rate of about 10 to about 30 percent of the heat input into the furnace to provide a stoichiometric air condition of about 70 to about 90 percent of that needed for the complete combustion of all fuel in the furnace;
(b) creating a reducing reburn zone in the furnace where the coal water slurry is injected to form reducing gas species that will react with the oxides of nitrogen to form diatomic nitrogen, thereby reducing the concentration of nitrogen oxides in the flue gases; and
(c) introducing overfire air into the furnace to bring the total stoichiometric air addition up to a level of about 110 to about 130 percent of that required to combust all of the fuel in the furnace, thereby providing for the complete combustion of reburn fuel gases created by the injection of the coal water slurry into the furnace, wherein the overfire air is introduced into the furnace at a point such that the flue gases have a residence time within the reburn zone of about 0.2 to about 1.5 seconds prior to being contacted with the overfire air.

48. The method of claim 47, wherein the ratio of the atomizing media to the coal water slurry reburn fuel is about 0.1 to about 0.4 lb/lb.

49. The method of claim 47, wherein the atomizing media is selected from the group consisting of air, steam, natural gas, nitrogen gas, an inert gas, and mixtures thereof.

50. The method of claim 47, wherein the carbonaceous fuel is selected from the group consisting of coal, petroleum coke, bitumen, fuel oil, non-aqueous mixtures thereof, and aqueous mixtures thereof.

51. The method of claim 47, wherein the coal water slurry comprises about 60 to about 35 weight percent of water, with the coal therein having a particle size up to about 200 mesh.

52. The method of claim 47, wherein the coal water slurry is injected into the furnace at a rate sufficient to provide for a stoichiometric air condition in the reburn zone of about 85 to about 90 percent of that needed for the complete combustion of all fuel in the furnace.

53. The method of claim 47, wherein the flue gases have a residence time within the reburn zone of about 0.4 to about 1 second prior to being contacted with the overfire air.

54. The method of claim 47, further comprising the step of adding an alkali compound to the reducing reburn zone in the furnace at a rate to provide for an alkali to sulfur mole ratio of about 0.5 to about 3.

55. The method of claim 54, wherein the alkali compound is selected from the group consisting of calcium carbonate, calcium oxide, calcium hydroxide, and mixtures thereof.

* * * * *

UNITED STATES PATENT AND TRADEMARK OFFICE
CERTIFICATE OF CORRECTION

PATENT NO. : 5,967,061
DATED : Oct. 19, 1999
INVENTOR(S) : Robert A. Ashworth; Donald K. Morrison; Roy Payne It is certified that error appears in the above-identified patent and that said Letters Patent is hereby corrected as shown below:

Col. 2, line 5, change "190157-1" to --90157-1--

Signed and Sealed this

Fifth Day of December, 2000

Attest:

Q. TODD DICKINSON

Attesting Officer

Director of Patents and Trademarks